(12) United States Patent
Harumoto et al.

(10) Patent No.: US 8,140,244 B2
(45) Date of Patent: Mar. 20, 2012

(54) DRIVING EVALUATING APPARATUS AND DRIVING EVALUATION METHOD

(75) Inventors: Satoshi Harumoto, Kobe (JP); Kouei Kiyo, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 516 days.

(21) Appl. No.: 12/453,604

(22) Filed: May 15, 2009

(65) Prior Publication Data

US 2009/0299594 A1    Dec. 3, 2009

(30) Foreign Application Priority Data

May 29, 2008    (JP) ................................. 2008-141647

(51) Int. Cl.
*B60T 7/12* (2006.01)

(52) U.S. Cl. .................... 701/104; 180/65.1; 180/65.21; 180/65.24; 701/93; 701/37; 701/36

(58) Field of Classification Search ................. 701/37, 701/36, 93, 104; 322/25; 320/137, 125; 324/433; 180/165, 305, 308, 54.1, 65.1; 138/30; 477/5
See application file for complete search history.

(56) References Cited

U.S. PATENT DOCUMENTS

| 7,706,953 | B1 * | 4/2010 | Sun ................................. 701/93 |
| 2009/0281691 | A1 * | 11/2009 | Sakakibara et al. ............ 701/37 |
| 2011/0120787 | A1 * | 5/2011 | Lee et al. ..................... 180/65.1 |

FOREIGN PATENT DOCUMENTS

| JP | A-2002-104023 | 4/2002 |
| JP | A-2007-22505 | 2/2007 |
| JP | A-2007-118926 | 5/2007 |

* cited by examiner

*Primary Examiner* — Behrang Badii
(74) *Attorney, Agent, or Firm* — Oliff & Berridge, PLC

(57) ABSTRACT

In an apparatus for evaluating fuel-saving driving of a vehicle, a detecting unit detects a starting point and an end point of a deceleration area; a storage unit stores therein deceleration value information representing a deceleration value per unit time tolerated for safely decelerating from a predetermined traveling speed to a predetermined deceleration completion speed; a calculating unit calculates an actual traveling distance during a time period from detection of the starting point until detection of the end point; an acquiring/calculating unit acquires the deceleration value corresponding to the traveling speed at the detected starting point from the storage unit, and calculates a tolerance deceleration traveling distance based on the traveling speed and the deceleration value; and a judging unit judges the timing of the starting point based on a result of comparison between the actual traveling distance and the tolerance deceleration traveling distance.

8 Claims, 7 Drawing Sheets

(1) STORE DECELERATION VALUE USED IN CALCULATING
TOLERANCE DECELERATION TRAVELING DISTANCE (2) CALCULATE ACTUAL TRAVELING DISTANCE AND TOLERANCE
DECELERATION TRAVELING DISTANCE (3) EVALUATE ACCELERATOR-OFF TIMING BY COMPARING
BOTH DISTANCES

FIG.3A

| AVERAGE VEHICLE SPEED [km/h] | 0 | 10 | 20 | 30 | 40 | 50 | 60 | 70 | 70- |
|---|---|---|---|---|---|---|---|---|---|
| DECELERATION VALUE [km/h/sec] | -8.77 | -8.77 | -8.74 | -8.31 | -8.29 | -6.53 | -5.50 | -4.00 | -3.00 |

FIG.3B

| AVERAGE VEHICLE SPEED [km/h] | 0 | 10 | 20 | 30 | 40 | 50 | 60 | 70 | 70- |
|---|---|---|---|---|---|---|---|---|---|
| DECELERATION VALUE [m/sec/sec] | -31.57 | -31.57 | -31.46 | 29.91 | -29.84 | -23.50 | -19.80 | -14.40 | -10.80 |

FIG.4

| DECELERATION START SPEED [km/h] | DECELERATION COMPLETION SPEED [km/h] | TOLERANCE DECELERATION TRAVELING DISTANCE [m] | TOLERANCE DECELERATION TRAVELING DISTANCE [sec] |
|---|---|---|---|
| 70 | 60 | 45.1 | 2.5 |
| | 50 | 83.0 | 5.0 |
| | 40 | 114.6 | 7.5 |
| | 30 | 138.9 | 10.0 |
| | 20 | 156.3 | 12.5 |
| | 10 | 166.7 | 15.0 |
| | 0 (STOP) | 170.1 | 17.5 |
| 60 | 50 | 27.8 | 1.8 |
| | 40 | 50.5 | 3.6 |
| | 30 | 68.2 | 5.4 |
| | 20 | 80.8 | 7.2 |
| | 10 | 88.4 | 9.0 |
| | 0 (STOP) | 90.9 | 10.8 |
| 50 | 40 | 19.1 | 1.5 |
| | 30 | 34.0 | 3.0 |
| | 20 | 44.7 | 4.5 |
| | 10 | 51.1 | 6.1 |
| | 0 (STOP) | 53.2 | 7.6 |
| 40 | 30 | 8.4 | 1.2 |
| | 20 | 20.1 | 2.4 |
| | 10 | 25.1 | 3.6 |
| | 0 (STOP) | 26.8 | 4.8 |
| 30 | 20 | 13.5 | 1.2 |
| | 10 | 13.4 | 2.4 |
| | 0 (STOP) | 15.1 | 3.6 |
| 20 | 10 | 4.77 | 1.1 |
| | 0 (STOP) | 6.36 | 2.3 |
| 10 | 0 (STOP) | — | — |

DRIVING EVALUATING APPARATUS AND DRIVING EVALUATION METHOD

CROSS-REFERENCE TO RELATED APPLICATION

This application is based upon and claims the benefit of priority of the prior Japanese Patent Application No. 2008-141647, filed on May 29, 2008, the entire contents of which are incorporated herein by reference.

BACKGROUND OF THE INVENTION

1. Field of the Invention

The present invention relates to a driving evaluating apparatus and a driving evaluation method for evaluating fuel-saving driving of a vehicle, and relates in particular to a driving evaluating apparatus and a driving evaluation method that can be used widely for various types of automobiles having different performances, and can evaluate driving quantitatively about ecological driving.

2. Description of the Related Art

In recent years, environment-friendly fuel-saving driving (ecological driving or so-called eco-driving) has been asked for in driving of a vehicle such as an automobile, in view of global environment. For example, driving with repetition of abrupt acceleration and abrupt deceleration consumes a large amount of fuel, and increases an amount of exhaust gas; therefore, such driving is not favorable in terms of ecological driving.

In one technique, in response to enhanced ecological driving awareness, a driver is informed of whether the driving state corresponds to ecological driving. For example, Japanese Patent Application Laid-open No. 2007-22505 discloses a technique of acquiring a state of acceleration/deceleration based on a vehicle speed, and displaying for a driver points of driving evaluation from which several points are subtracted in cases of abrupt acceleration or abrupt deceleration, which are against ecological driving.

However, in the technique disclosed in Japanese Patent Application Laid-open No. 2007-22505, merely an abstract driving state against ecological driving is defined, and a specific evaluation approach for ecological driving is not presented. Accordingly, the technique of Japanese Patent Application Laid-open No. 2007-22505 has a problem that quantitative evaluation of whether the driving state is ecological driving is not possible.

Although some automobiles evaluate driving based on a fuel consumption rate of their own, the fuel consumption rate is usually different for types of automobiles, and displacements of engines, for example. Accordingly, the approach of evaluating ecological driving based on a fuel consumption rate is not a versatile approach.

SUMMARY OF THE INVENTION

It is an object of the present invention to at least partially solve the problems in the conventional technology.

According to an aspect of an embodiment of the present invention, a driving evaluating apparatus that evaluates fuel-saving driving of a vehicle, includes a deceleration area detecting unit that detects a starting point and an end point of a deceleration area as an evaluated subject for the fuel-saving driving based on an accelerator opening rate; a deceleration value information storage unit that stores therein deceleration value information representing a deceleration value per unit time at which the vehicle safely decelerates from a predetermined traveling speed to a predetermined deceleration completion speed; an actual traveling distance calculating unit that calculates an actual traveling distance that the vehicle travels during a time period from detection of the starting point by the deceleration area detecting unit to detection of the end point by the deceleration area detecting unit; a tolerance deceleration traveling distance calculating unit that acquires the deceleration value corresponding to a traveling speed at the starting point detected by the deceleration area detecting unit from the deceleration value information storage unit, and calculates a tolerance deceleration traveling distance based on the traveling speed and the deceleration value; and a timing judging unit that judges deceleration timing at the starting point based on a result of comparison between the actual traveling distance calculated by the actual traveling distance calculating unit and the tolerance deceleration traveling distance calculated by the tolerance deceleration traveling distance calculating unit.

According to another aspect of an embodiment of the present invention, a method for evaluating fuel-saving driving of a vehicle, includes detecting a starting point and an end point defining a deceleration area as an evaluated subject for the fuel-saving driving based on an accelerator opening rate; storing deceleration value information representing a deceleration value per unit time at which the vehicle safely decelerates from a predetermined traveling speed to a predetermined deceleration completion speed; calculating an actual traveling distance that the vehicle travels during a time period from detection of the starting point by the detecting to detection of the end point by the detecting; acquiring the deceleration value corresponding to a traveling speed at the starting point detected by the detecting from the stored deceleration value information, and calculating a tolerance deceleration traveling distance based on the traveling speed and the deceleration value; and judging deceleration timing at the starting point based on a result of comparison between the calculated actual traveling distance and the calculated tolerance deceleration traveling distance.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A and 3B are tables for listing examples of deceleration value information;

FIG. 4 is a table for listing calculation examples of a tolerance deceleration traveling distance;

DETAILED DESCRIPTION OF THE PREFERRED EMBODIMENTS

Exemplary embodiments of a driving evaluating apparatus and a driving evaluation method according to the present invention are described below in greater detail with reference to the accompanying drawings. First, in the following, an outline of the driving evaluation method according to the present invention is explained with reference to FIG. 1, and then an embodiment of the driving evaluating apparatus to which the driving evaluation approach is applied is explained.

Figure 1:
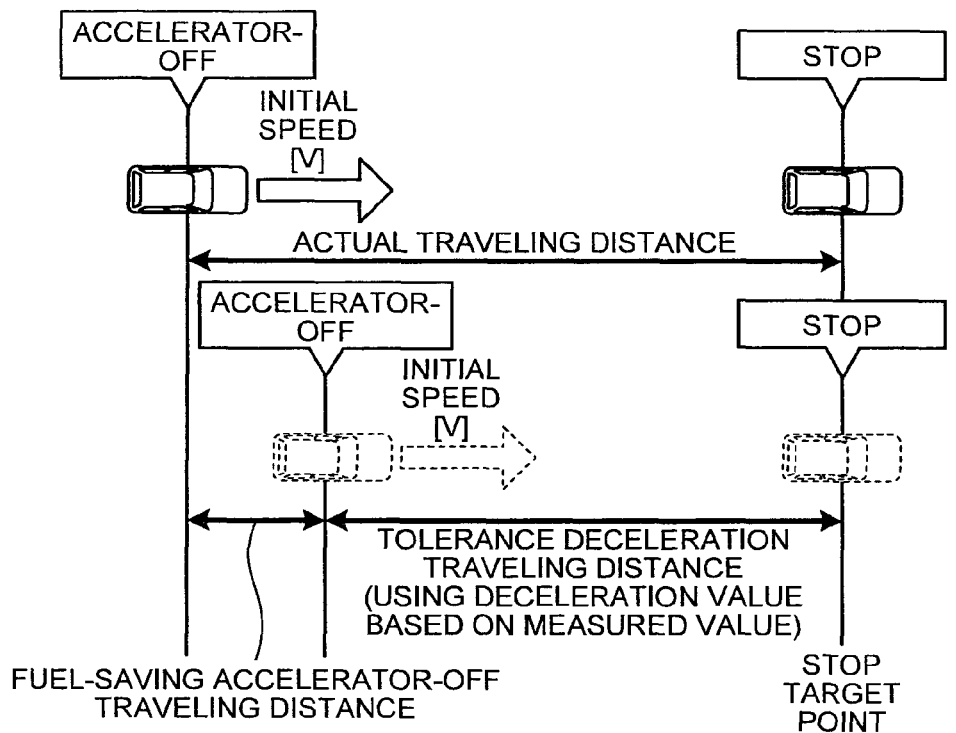
FIG. 1 is a schematic of a driving evaluation method according to the present invention.

An outline of the driving evaluation method according to the present invention is explained with reference to FIG. 1. FIG. 1 is a schematic of the driving evaluation method according to the present invention. Referring to FIG. 1, the driving evaluation method according to the present invention evaluates ecological driving in a situation where a vehicle decelerates.

The driving evaluation method according to the present invention is based on the idea that, when a vehicle is to be stopped at a predetermined stop target point for example, if the timing of an accelerator-off operation is earlier than the timing of an average accelerator-off operation, it is evaluated that a driving operation equivalent to fuel saving has been performed. In other words, when a vehicle is to be stopped at a target stop position, the earlier the timing of an accelerator-off operation is, the more suppression of fuel consumption becomes possible.

Based on the above idea, in the driving evaluation method according to the present invention, when an "actual traveling distance" depicted in FIG. 1 is larger than a "tolerance deceleration traveling distance" calculated by using measured data prepared in advance, that is, when a "fuel saving accelerator-off traveling distance" depicted in FIG. 1 is a positive value, the accelerator-off timing is evaluated to be favorable.

Specifically, the area from where "accelerator-off" is detected during traveling of a vehicle at a speed, "initial speed (V)", to where the vehicle stops is detected as a deceleration area. The "accelerator-off" means that an accelerator opening rate becomes for example less than 50%. The distance that the vehicle travels from the accelerator-off to the stop is calculated (measured) as an "actual traveling distance".

The calculated "actual traveling distance" and a "tolerance deceleration traveling distance" are compared with each other. The "tolerance deceleration traveling distance" is calculated from a tolerance deceleration value (hereinafter, "deceleration value") prepared in advance based on a measured value, and the initial speed (V), which is a vehicle speed at the time of accelerator-off. The "tolerance deceleration traveling distance" means a traveling distance that a vehicle can travel while safely decelerating from the speed at the time of accelerator-off. The "deceleration value" used in calculating the "tolerance deceleration traveling distance" is a deceleration value tolerated for safety driving, that is, a maximum acceleration that does not accompany abrupt deceleration.

Data measured in advance under a specific measurement condition is used for the "deceleration value". In measurement of the deceleration value, for example, the distance that the vehicle travels since a signal 200 meters ahead in the advancing direction turns yellow until the vehicle stops after an accelerator-off operation by a driver is acquired while changing the initial speed (V) for multiple types of automobile, and for a plurality of drivers. A deceleration value for each initial speed (V) is collected by taking an average of measured deceleration values (simple average or weighted average).

In this way, a deceleration value used in tolerance deceleration traveling distance calculation is stored in advance in the driving evaluation method according to the present invention (see (1) in FIG. 1). When a starting point of a deceleration area (accelerator-off) is detected, an actual traveling distance to an end point of the deceleration area (stop target point) is calculated, and a tolerance deceleration traveling distance is calculated based on an initial speed (V) and a deceleration value corresponding to the initial speed (V) (see (2) in FIG. 1). Furthermore, both the distances (actual traveling distance and tolerance deceleration traveling distance) are compared with each other to evaluate an accelerator-off timing (see (3) in FIG. 1).

That is, because a deceleration value (tolerance deceleration value) obtained by measurement is used, the driving evaluation method according to the present invention can be used widely for various automobiles having different performances. By using the concept of "tolerance deceleration traveling distance", ecological driving can be evaluated quantitatively.

In the following, an embodiment of the driving evaluating apparatus to which the driving evaluation method is applied is explained. Although a driving evaluating apparatus mounted on a vehicle such as an automobile is explained in the following embodiment, the driving evaluating apparatus may be configured on a server apparatus provided on a network with which a vehicle can communicate.

Figure 2:
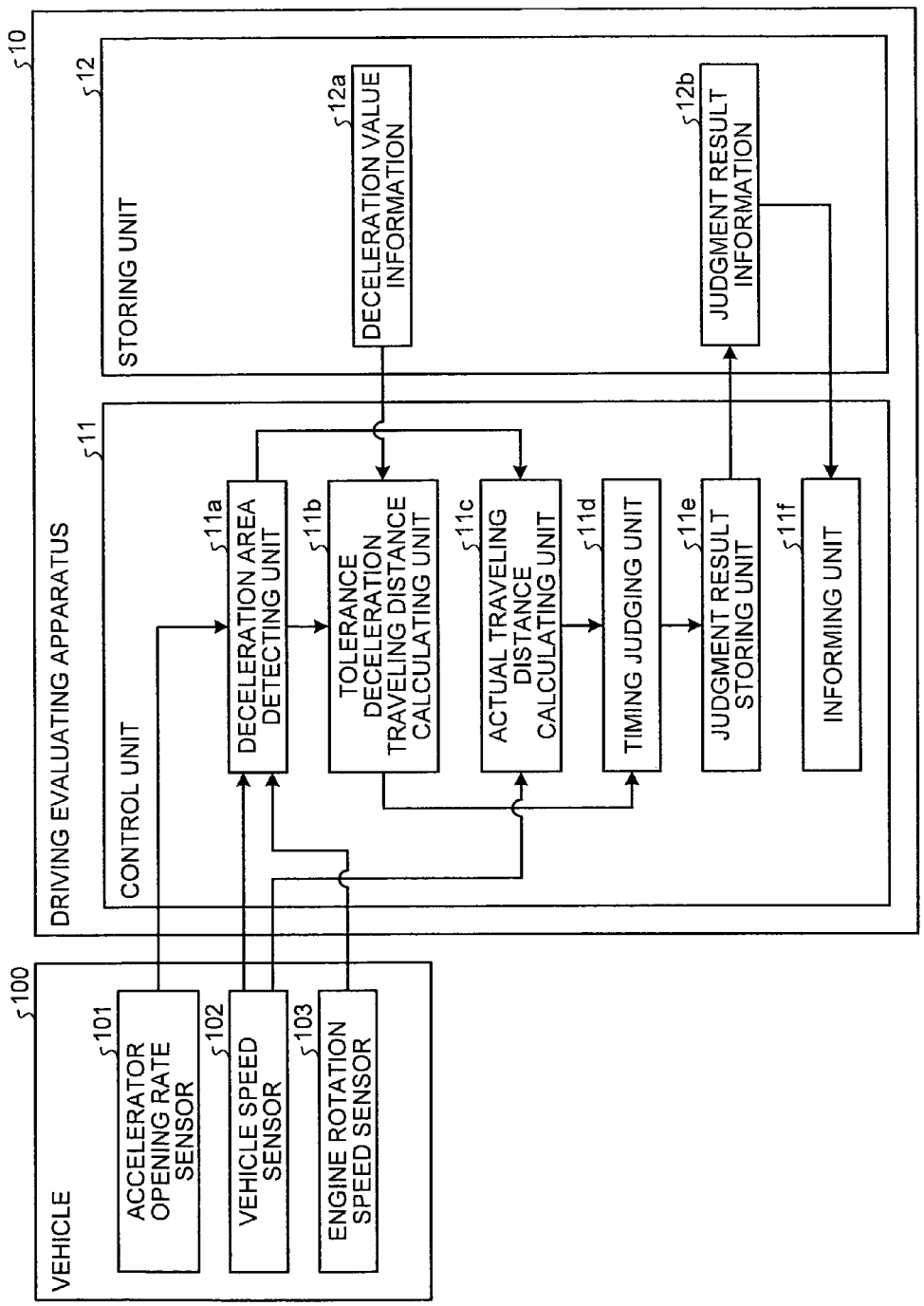
FIG. 2 is a schematic of a configuration of a driving evaluating apparatus according to an embodiment.

FIG. 2 is a schematic of a configuration of a driving evaluating apparatus 10 according to the present embodiment. The driving evaluating apparatus 10 acquires an accelerator opening rate, a vehicle speed, and an engine rotation speed, respectively, from an accelerator opening rate sensor 101, a vehicle speed sensor 102, and an engine rotation speed sensor 103 of a vehicle 100. The driving evaluating apparatus 10 may acquire sensor values from the vehicle sensors through an engine control unit (ECU) of the vehicle 100.

Referring to FIG. 2, the driving evaluating apparatus 10 includes a control unit 11, and a storage unit 12. The control unit 11 includes a deceleration area detecting unit 11a, a tolerance deceleration traveling distance calculating unit 11b, an actual traveling distance calculating unit 11c, a timing judging unit 11d, a judgment result storage unit 11e, and an informing unit 11f. The storage unit 12 stores therein deceleration value information 12a, and judgment result information 12b.

The control unit 11 judges timing (or quality) of driving by detecting a deceleration area as an evaluated subject based on a signal value from the vehicle sensors mounted on the vehicle 100, calculating an actual traveling distance and a tolerance deceleration traveling distance, and comparing the both traveling distances with each other. The control unit 11 stores therein the timing judgment result, and informs occupants such as a driver of the stored timing judgment result.

The deceleration area detecting unit 11a detects a deceleration area as an evaluated subject based on an accelerator opening rate from the accelerator opening rate sensor 101, a vehicle speed from the vehicle speed sensor 102, and an engine rotation speed from the engine rotation speed sensor 103.

Specifically, the deceleration area detecting unit 11a detects a deceleration area when a vehicle speed is larger than a predetermined speed threshold (for example, 10 km/h). The speed threshold to judge whether a deceleration area is detected is used to exclude a case where a vehicle travels at a low speed due to traffic jam, for example, and therefore effectiveness of ecological driving evaluation is low.

When it is decided to detect a deceleration area, the deceleration area detecting unit 11a detects a starting point of the deceleration area. The starting point detection condition is for example that the accelerator opening rate is less than 0.5%, and the engine rotation speed is larger than 1000 rpm. That the accelerator opening rate is less than 0.5% means that the driver has stopped pressing down the accelerator (accelerator-off). A lower limit of the engine rotation speed is set for excluding an idle running state where a vehicle travels without its accelerator being pressed down.

When the starting point of the deceleration area is detected, the deceleration area detecting unit 11a detects the end point of the deceleration area. The end point detection condition is for example that the accelerator opening rate is equal to or more than 0.5%. That the accelerator opening rate is equal to or more than 0.5% means that the driver is pressing down the accelerator (accelerator-on). When the vehicle speed becomes 0 km/h without accelerator-on, that is, when the vehicle stops, the timing when the vehicle speed has become 0 km/h is detected as the end point.

After detecting the starting point and the end point of the deceleration area in this way, the deceleration area detecting unit 11a notifies the tolerance deceleration traveling distance calculating unit 11b of the vehicle speed at the starting point, and notifies the actual traveling distance calculating unit 11c that the starting point and the end point have been detected.

The tolerance deceleration traveling distance calculating unit 11b calculates a tolerance deceleration traveling distance based on the vehicles speeds at the starting point (starting point of the deceleration area) and the end point (end point of the deceleration area) notified from the deceleration area detecting unit 11a, and the deceleration value information 12a stored in the storage unit 12. The tolerance deceleration traveling distance calculating unit 11b also notifies the timing judging unit 11d of the calculated tolerance deceleration traveling distance. An example of the deceleration value information 12a used in calculating the tolerance deceleration traveling distance, and a calculation example of the tolerance deceleration traveling distance are explained with reference to FIGS. 3A, 3B and 4.

FIGS. 3A and 3B are tables for listing examples of the deceleration value information 12a. In FIG. 3A, the deceleration value information 12a including deceleration values in a unit of "km/h/sec" is listed, and in FIG. 3B, the deceleration value information 12a including deceleration values in a unit of "m/sec/sec" is listed.

Referring to FIG. 3A, the deceleration value information 12a is for example information in a table format in which average vehicle speeds (km/h) are sectioned every 10 km/h, and deceleration values corresponding to the average vehicle speeds are associated with each other. When the average vehicle speed listed in FIG. 3A is 70 km/h, the deceleration value is −4.00 km/h/sec. When the average vehicle speed is larger than 70 km/h, the deceleration value is −3.00 km/h/sec.

When the average vehicle speed and the deceleration value listed in FIG. 3A are defined as "V" and "A1", respectively, the time required for a vehicle traveling at the vehicle speed "V" to stop "T (sec)" is expressed by the formula "T=−V/A1". The tolerance deceleration traveling distance "L (m)" of a vehicle traveling at the vehicle speed "V" to stop is expressed by the formula "L=−(V×V)/(2×(A1×1000/3600))". "A1" is multiplied by "1000/3600" to convert the unit of the tolerance deceleration traveling distance "L" into "m".

Alternatively, a deceleration value "A2" obtained by multiplying "A1" with "1000/3600" may be prepared in advance to make the calculation of the tolerance deceleration traveling distance "L (m)" easier. The deceleration value listed in FIG. 3B is expressed by the formula "A2=A1×3600/100". In other words, each deceleration value listed in FIG. 3B is obtained by multiplying each deceleration value listed in FIG. 3B with 3.6(3600/1000).

By using the deceleration value "A2" listed in FIG. 3B, the tolerance deceleration traveling distance "L (m)" of a vehicle traveling at the vehicle speed "V" to stop is expressed by the formula "L=−(V×V)/(2×A2)". The tolerance deceleration traveling distance (L (m)) of a vehicle traveling at a vehicle speed "Vs" to decelerate to a vehicle speed "Ve" is expressed by the formula "L=−(Vs×Vs)/(2×A2)+(Ve×Ve)/(2×A2)".

FIG. 4 is a table for listing calculation examples of a tolerance deceleration traveling distance. The tolerance deceleration traveling distance listed in FIG. 4 can for example be calculated by the formula "L=−(Vs×Vs)/(2×A2)+(Ve×Ve)/(2×A2)" using the deceleration value "A2" listed in FIG. 3B. The tolerance deceleration traveling distance listed in FIG. 4 can be calculated by "T=−V/A1" using the deceleration value "A1" listed in FIG. 3A.

For example, when a vehicle decelerates from 60 km/h to 20 km/h, the deceleration value corresponding to 60 km in FIG. 3B is −19.80. Accordingly, the tolerance deceleration traveling distance L is calculated as −(60×60)/(2×(−19.80)+(20×20)/2×(−19.80)=80.8.

The actual traveling distance calculating unit 11c will now be explained. The actual traveling distance calculating unit 11c calculates an actual traveling distance from the starting point to the end point of the deceleration area received from the deceleration area detecting unit 11a based on the vehicle speed received from the vehicle speed sensor 102. The actual traveling distance calculating unit 11c also notifies the timing judging unit 11d of the calculated actual traveling distance.

The timing judging unit 11d judges timing of the starting point of the deceleration area detected by the deceleration area detecting unit 11a, that is, timing of accelerator-off operation by comparing the "tolerance deceleration traveling distance" calculated by the tolerance deceleration traveling distance calculating unit 11b, and the "actual traveling distance" calculated by the actual traveling distance calculating unit 11c with each other.

The timing judging unit 11d judges whether the timing of the accelerator-off operation is equivalent to fuel-saving driving using the formula "actual traveling distance−tolerance deceleration traveling distance>α". In the formula, α is a predetermined threshold equal to or more than 0. For example, when the threshold α is 0, the timing judging unit 11d judges the timing of the accelerator-off to be "good" when the actual traveling distance is larger than the tolerance deceleration traveling distance. The timing judging unit 11d at the same time notifies the judgment result storage unit 11e of the judgment result.

The judgment result storage unit 11e stores the judgment result received from the timing judging unit 11d in the storage unit 12 as the judgment result information 12b. For example, the judgment result storage unit 11e stores information such as the timing judgment result, judgment time, vehicle speeds at a starting point and an end point of a deceleration area, and the actual traveling distance and the tolerance traveling distance in the judgment area as the judgment result information 12b.

The informing unit 11f informs occupants such as a driver of the evaluation result of driving based on the judgment result information 12b stored in the storage unit 12. For example, the informing unit 11f makes a display (not shown), for example, display a timing judgment result of each deceleration area. The display timing of the timing judgment result may be at each detection time of an end point of a deceleration area, or at the timing when the vehicle stops. The informing unit 11f may also accumulate therein judgment results each day, and display accumulated information of the judgment results when a driver requests such display.

The storage unit 12 is configured by a storage device such as a memory or a hard disk drive, and stores therein the deceleration value information 12a, and the judgment result information 12b. The deceleration value information 12a is described with reference to FIGS. 3A and 3B, and the judgment result information 12b is explained in the explanation of the informing unit 11f; therefore, their explanation is not repeated.

Figure 5:
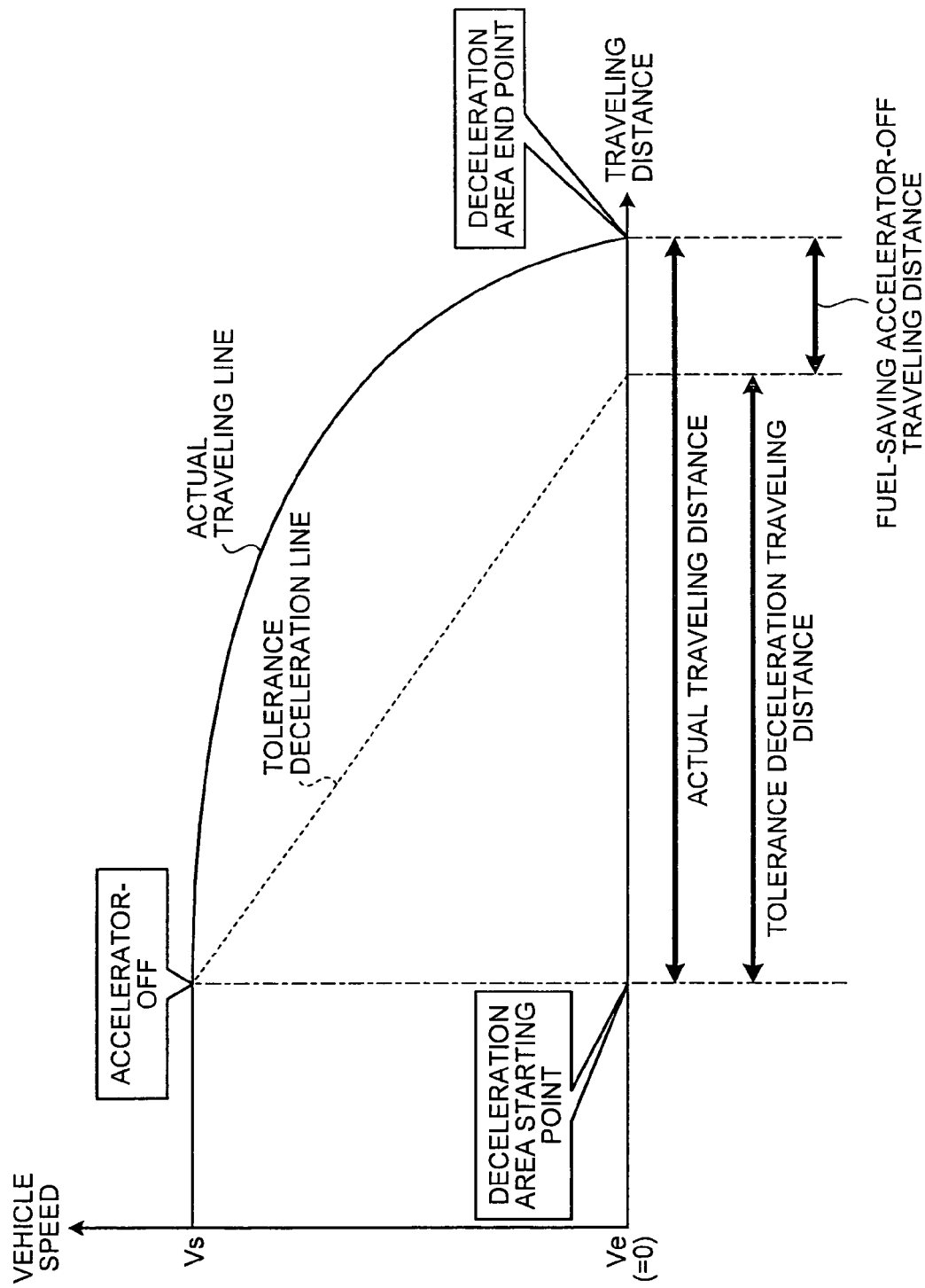
FIG. 5 is a graph of the relationship between a vehicle speed and a traveling distance when a vehicle speed at a deceleration area end point is 0.

The relationship between a vehicle speed and a traveling distance when the vehicle speed at a deceleration area end point is 0 is explained with reference to FIG. 5. FIG. 5 is a graph of the relationship between a vehicle speed and a traveling distance when the vehicle speed at a deceleration area end point is 0. The vertical axis of FIG. 5 represents vehicle speeds, and the horizontal axis represents traveling distances. Vs in FIG. 5 represents a vehicle speed at the time point when accelerator-off is detected, that is, a vehicle speed at a deceleration area starting point. Ve in FIG. 5 represents a vehicle speed at a deceleration area end point, that is, 0 km/h.

Referring to FIG. 5, the actual traveling distance is a distance that a vehicle actually travels from the time point when accelerator-off is detected (deceleration area starting point) until the time point when the vehicle speed becomes 0 (deceleration area end point), and is calculated by the actual traveling distance calculating unit 11c depicted in FIG. 2. The tolerance deceleration traveling distance is a distance calculated based on a vehicle speed (Vs) at the time point when accelerator-off is detected (deceleration area starting point), and a deceleration value (see FIGS. 3A and 3B) corresponding to Vs, and is calculated by the tolerance deceleration traveling distance calculating unit 11b depicted in FIG. 2.

The distance obtained by subtracting the tolerance deceleration traveling distance from the actual traveling distance becomes a fuel-saving accelerator-off traveling distance as depicted in FIG. 5. The actual traveling line depicted in FIG. 5 represents transition of an actual vehicle speed, and the tolerance deceleration line represents transition of a virtual vehicle speed calculated from Vs and the deceleration value corresponding to Vs (see FIGS. 3A and 3B).

Figure 6:
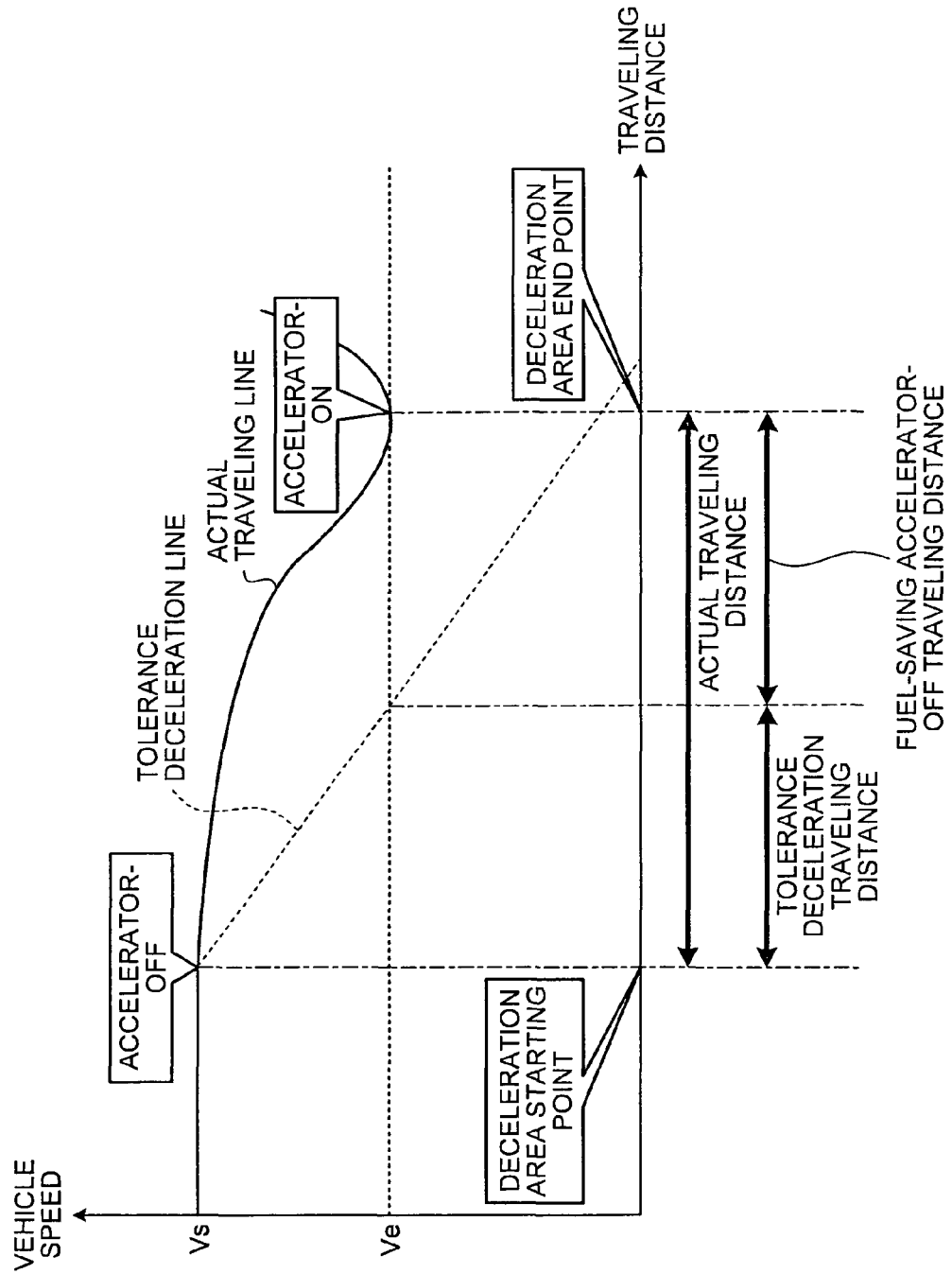
FIG. 6 is a graph of the relationship between a vehicle speed and a traveling distance when a vehicle speed at a deceleration area end point is not 0.

The relationship between a vehicle speed and a traveling distance when the vehicle speed at a deceleration area end point is not 0 is explained with reference to FIG. 6. FIG. 6 is a graph of the relationship between a vehicle speed and a traveling distance when the vehicle speed at a deceleration area end point is not 0. In an example depicted in FIG. 6, the deceleration area detecting unit 11a detects a deceleration area starting point by accelerator-off detection, and then detects a deceleration area end point by accelerator-on detection.

The vertical axis depicted in FIG. 6 represents vehicle speeds, and the horizontal axis represents traveling distances. Vs depicted in FIG. 6 represents a vehicle speed at the time point when accelerator-off is detected, that is, a vehicle speed at a deceleration area starting point. Ve depicted in FIG. 6 represents a vehicle speed at a deceleration area end point.

Referring to FIG. 6, the actual traveling distance is a distance that a vehicle actually travels from the time point when accelerator-off is detected (deceleration area starting point) until the time point when accelerator-on is detected (deceleration area end point), and is calculated by the actual traveling distance calculating unit 11c depicted in FIG. 2. The tolerance deceleration traveling distance is a distance that a vehicle travels until the vehicle decelerates to the vehicle speed (Ve) at the time point when accelerator-on is detected (deceleration area end point) based on a vehicle speed (Vs) at the time point when accelerator-off is detected (deceleration area starting point), and a deceleration value corresponding to Vs (see FIGS. 3A and 3B), and is calculated by the tolerance deceleration traveling distance calculating unit 11b depicted in FIG. 2 (see FIG. 4).

The distance obtained by subtracting the tolerance deceleration traveling distance from the actual traveling distance becomes a fuel saving accelerator-off traveling distance as in the case of FIG. 5. The actual traveling line depicted in FIG. 6 represents transition of an actual vehicle speed, and the tolerance deceleration line represents transition of a virtual vehicle speed calculated from Vs and a deceleration value corresponding to Vs (see FIGS. 3A and 3B). These are the same as in the case of FIG. 5.

Figure 7:
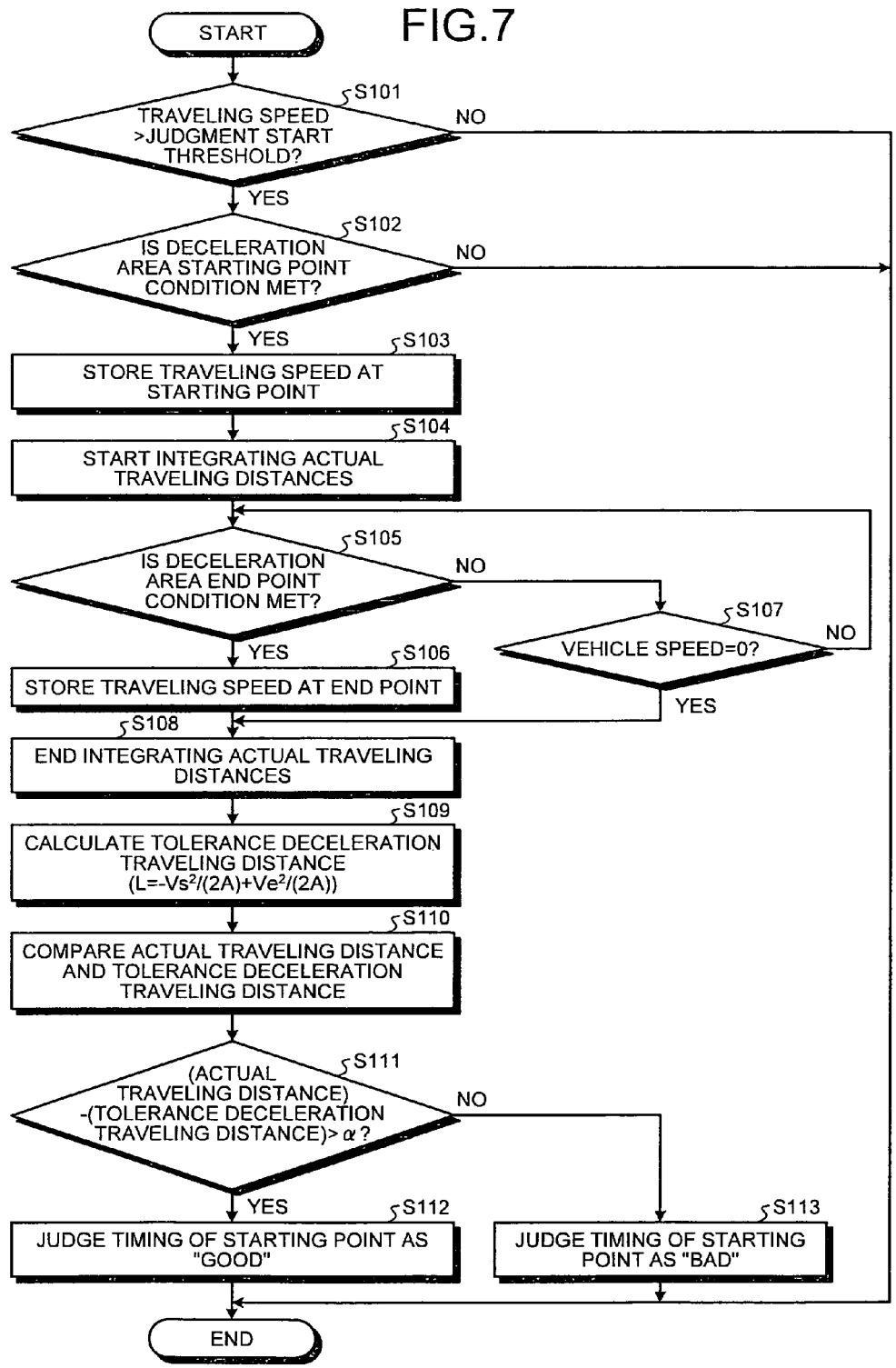
FIG. 7 is a flowchart of the procedure executed by the driving evaluating apparatus.

Procedure executed by the driving evaluating apparatus 10 is explained with reference to FIG. 7. FIG. 7 is a flowchart of the procedure executed by the driving evaluating apparatus 10. Referring to FIG. 7, the procedure up to timing judgment of driving performed by the timing judging unit 11d is illustrated.

As illustrated in FIG. 7, the deceleration area detecting unit 11a judges whether a traveling speed is larger than a judgment start threshold to judge whether to start driving evaluation (Step S101). Then, when the judgment condition of Step S101 is met (YES at Step S101), it is determined whether a deceleration area starting point condition is met (Step S102). The deceleration area starting point condition is for example that the accelerator opening rate is lower than 0.5%, and the engine rotation speed is larger than 1000 rpm.

When the deceleration area starting point condition is met (YES at Step S102), the traveling speed (Vs) at the starting point of the deceleration area is stored (Step S103). When the judgment condition of Step S101 is not met (NO at Step S101), and when the judgment condition of Step S102 is not met (NO at Step S102), the processing ends without evaluating driving.

Then, the actual traveling distance calculating unit 11c starts integrating actual traveling distances (Step S104), and the deceleration area detecting unit 11a judges whether a deceleration area endpoint condition is met (Step S105). The deceleration area endpoint condition is for example that the accelerator opening rate is equal to or more than 0.5.

When the deceleration area endpoint condition is met (YES at Step S105), the traveling speed (Ve) at the end point of the deceleration area is stored (Step S106). On the other hand, when the deceleration area endpoint condition is not met (NO at Step S105), it is judged whether the vehicle speed has become 0, that is, whether the vehicle has stopped (Step S107).

When the vehicle speed is 0 (YES at Step S107), the processing transitions to Step S108. In this case, the traveling speed (Ve) at the end point of the deceleration area is deemed as 0. On the other hand, when the vehicle speed is not 0 (NO at Step S107), the processing of and after Step S105 is repeated.

Then, the actual traveling distance calculating unit 11c ends integrating actual traveling distances (Step S108), and the tolerance deceleration traveling distance calculating unit 11b calculates the tolerance deceleration traveling distance (Step S109). When the tolerance deceleration value is "L", the vehicle speed at the deceleration area starting point is "Vs", the vehicle speed at the deceleration area end point is "Ve", and the deceleration value corresponding to "Vs" (see FIGS. 3A and 3B) is "A", the tolerance deceleration value "L" is calculated as "$L = -Vs^2/(2A) + Ve^2/(2A)$".

Then, the timing judging unit 11d compares the actual traveling distance and the tolerance deceleration traveling distance with each other (Step S110), judges the timing of a deceleration area starting point to be "good" (Step S112)

when the value obtained by subtracting the tolerance deceleration traveling distance from the actual traveling distance is larger than a predetermined threshold α (YES at Step S111), and ends the processing. On the other hand, when the judgment condition of Step S111 is not met (NO at Step S111), the timing judging unit 11d judges the timing of the deceleration area starting point to be "bad" (Step S113), and ends the processing.

As has been explained above, in the driving evaluating apparatus according to the present embodiment, the deceleration area detecting unit detects a starting point and an end point of a deceleration area as an evaluated subject for fuel-saving driving based on an accelerator opening rate; the storage unit stores therein deceleration value information representing a deceleration value per unit time tolerated for safely decelerating from a predetermined traveling speed to a predetermined deceleration completion speed; the actual traveling distance calculating unit calculates an actual traveling distance that the vehicle travels during a time period from detection of the starting point of the deceleration area until detection of the end point of the deceleration area; the tolerance deceleration traveling distance calculating unit acquires the deceleration value corresponding to the traveling speed at the detected starting point of the deceleration area from the storage unit, and calculates a tolerance deceleration traveling distance based on the traveling speed and the deceleration value; and the timing judging unit judges the timing of the starting point of the deceleration area based on a result of comparison between the calculated actual traveling distance and the tolerance deceleration traveling distance.

Accordingly, the driving evaluating apparatus can be applied to various types of automobiles having different performances by using a deceleration value (tolerance deceleration value) obtained by measurement. By using the concept of "tolerance deceleration traveling distance", driving can be evaluated quantitatively about ecological driving.

Although in the embodiment explained above, the driving evaluating apparatus mounted on a vehicle evaluates driving based on vehicle sensors (such as a accelerator opening rate sensor and a vehicle speed sensor), the driving may be evaluated by further using location information (arrangement information of roads, and buildings, for example) acquired from a car navigation device, changing state of a signal acquired from a traffic information system, weather information, and other information. This enables driving evaluation with higher accuracy by reflecting driving conditions of a vehicle.

Although in the embodiment explained above, static deceleration value information prepared in advance by measurement is used, the deceleration value information may be corrected dynamically in accordance with traveling conditions. For example, the deceleration information may be corrected based on information obtained by learning an actual fuel consumption rate and fuel consumption of a vehicle on which the driving evaluating apparatus is mounted, and the fuel consumption state of the vehicle in accordance with operation by a driver, for example. This enables further improvement of driving evaluation accuracy.

Furthermore, multiple types of the deceleration value information prepared in advance corresponding to vehicle types and engine types may be switched according to a vehicle on which the driving evaluating apparatus is mounted. Alternatively, the deceleration value information adapted to a vehicle on which the driving evaluating apparatus is mounted may be downloaded through a network.

As has been explained above, the driving evaluating apparatus and the driving evaluation method are useful for evaluation about ecological driving, and in particular are suited for driving evaluation that can be widely used for various types of automobiles having different performances.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving evaluating apparatus that evaluates fuel-saving driving of a vehicle, the driving evaluating apparatus comprising:
   a deceleration area detecting unit that detects a starting point and an end point of a deceleration area as an evaluated subject for the fuel-saving driving based on an accelerator opening rate;
   a deceleration value information storage unit that stores therein deceleration value information representing a deceleration value per unit time at which the vehicle safely decelerates from a predetermined traveling speed to a predetermined deceleration completion speed;
   an actual traveling distance calculating unit that calculates an actual traveling distance that the vehicle travels during a time period from detection of the starting point by the deceleration area detecting unit to detection of the end point by the deceleration area detecting unit;
   a tolerance deceleration traveling distance calculating unit that acquires the deceleration value corresponding to a traveling speed at the starting point detected by the deceleration area detecting unit from the deceleration value information storage unit, and calculates a tolerance deceleration traveling distance based on the traveling speed and the deceleration value; and
   a timing judging unit that judges deceleration timing at the starting point based on a result of comparison between the actual traveling distance calculated by the actual traveling distance calculating unit and the tolerance deceleration traveling distance calculated by the tolerance deceleration traveling distance calculating unit.

2. The driving evaluating apparatus according to claim 1, wherein the deceleration area detecting unit detects the starting point of the deceleration area when an engine rotation speed of the vehicle is larger than a predetermined rotation number threshold, and the accelerator opening rate is lower than a predetermined opening rate threshold, and after detecting the starting point, detects the end point of the deceleration area when the accelerator opening rate is equal to or more than the opening rate threshold.

3. The driving evaluating apparatus according to claim 2, wherein the deceleration area detecting unit detects the end point of the deceleration area under a condition that a traveling speed of the vehicle becomes 0 even when, after detecting the starting point of the deceleration area, the accelerator opening rate is less than the opening rate threshold.

4. The driving evaluating apparatus according to claim 1, wherein the deceleration area detecting unit detects the starting point and the end point when a traveling speed of the vehicle is larger than a predetermined speed threshold.

5. The driving evaluating apparatus according to claim 1, wherein the timing judging unit judges timing of the starting point to be favorable when a value obtained by subtracting the tolerance deceleration traveling distance from the actual traveling distance is larger than a predetermined judgment threshold.

6. The driving evaluating apparatus according to claim 1, further comprising:
- a history storage unit that stores therein history of timing judgment results made by the timing judging unit; and
- an informing unit that informs content of the history stored in the history storage unit.

7. The driving evaluating apparatus according to claim 1, wherein the deceleration value information stored in the deceleration value information storage unit is an average value of the deceleration value acquired in advance based on a specific measurement condition.

8. A method for evaluating fuel-saving driving of a vehicle, comprising:
- detecting a starting point and an end point defining a deceleration area as an evaluated subject for the fuel-saving driving based on an accelerator opening rate;
- storing deceleration value information representing a deceleration value per unit time at which the vehicle safely decelerates from a predetermined traveling speed to a predetermined deceleration completion speed;
- calculating an actual traveling distance that the vehicle travels during a time period from detection of the starting point by the detecting to detection of the end point by the detecting;
- acquiring the deceleration value corresponding to a traveling speed at the starting point detected by the detecting from the stored deceleration value information, and calculating a tolerance deceleration traveling distance based on the traveling speed and the deceleration value; and
- judging deceleration timing at the starting point based on a result of comparison between the calculated actual traveling distance and the calculated tolerance deceleration traveling distance.

* * * * *